June 12, 1928.
C. Z. SMITH
1,673,716
VEHICLE BRAKE
Filed Sept. 11, 1926     3 Sheets-Sheet 1
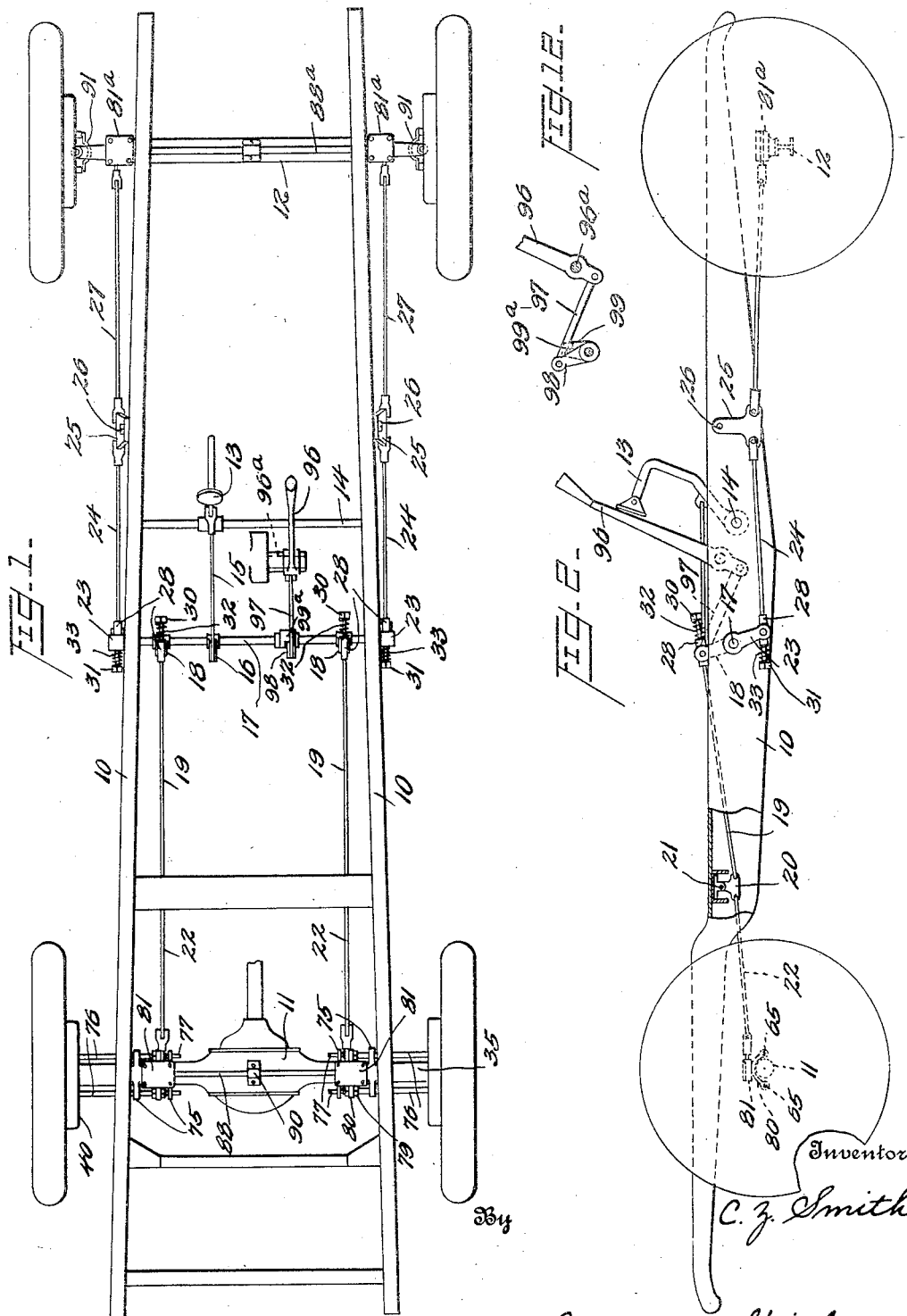
Inventor
C. Z. Smith
By Watson, Coit, Morse & Grindle Attorneys

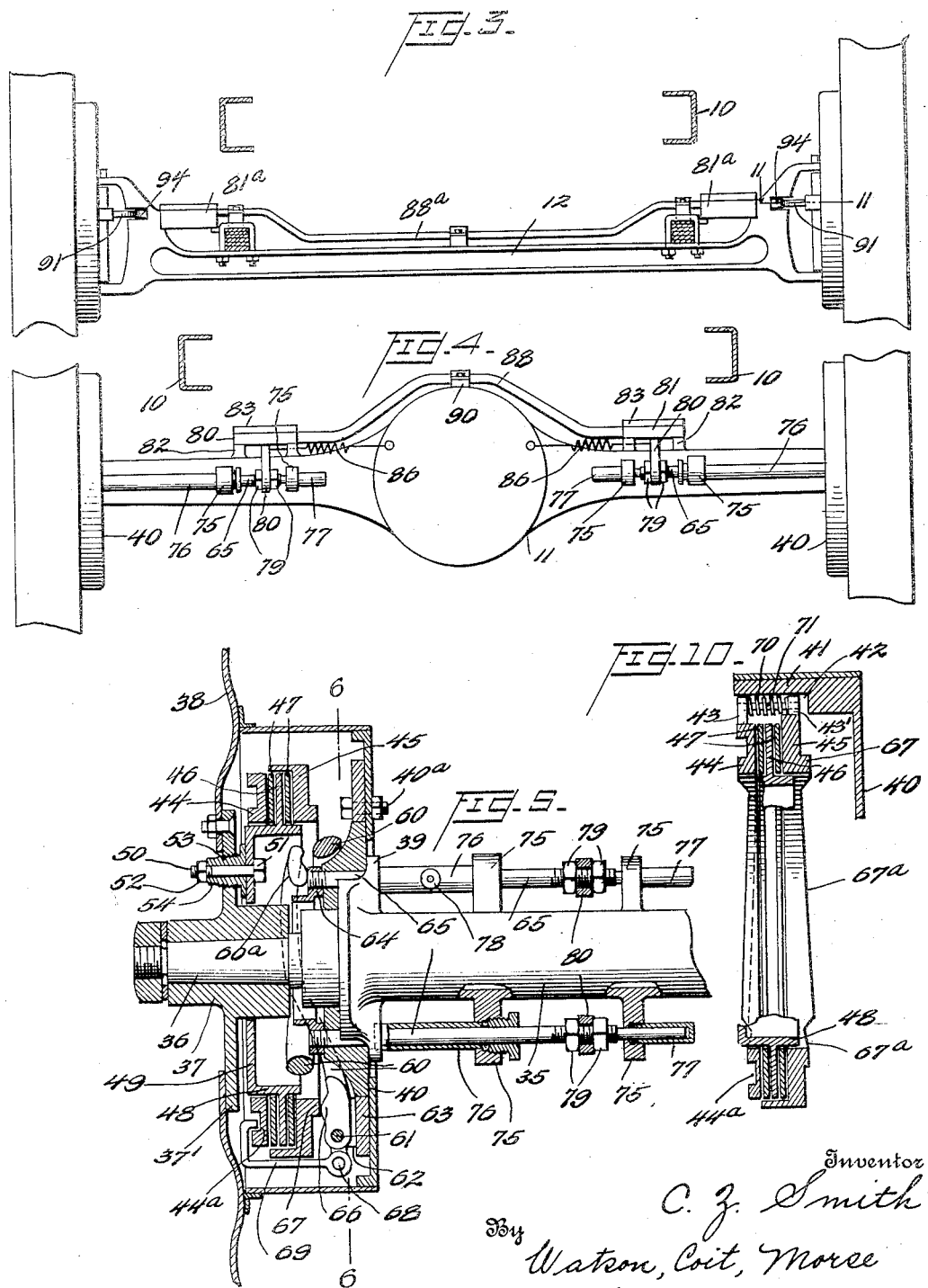

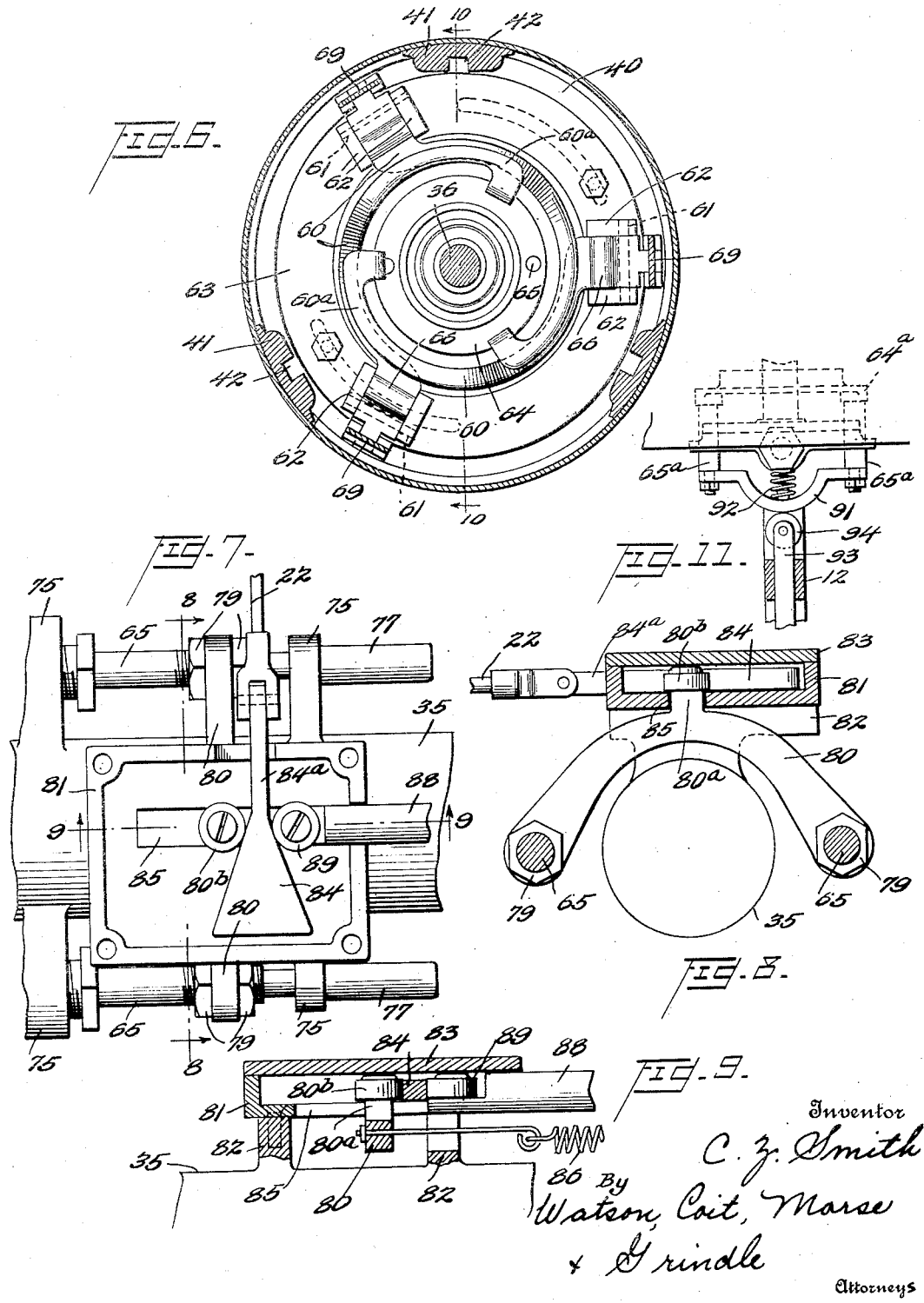

Patented June 12, 1928.

1,673,716

UNITED STATES PATENT OFFICE.

CLARENCE Z. SMITH, OF ATLANTA, GEORGIA.

VEHICLE BRAKE.

Application filed September 11, 1926. Serial No. 134,805.

The present invention relates to vehicle brakes and particularly to brakes for motor vehicles designed and constructed to apply braking force to each of the four wheels of the vehicle at the will of the operator.

The object of the invention is to provide such a vehicle braking mechanism which is entirely reliable in operation, which embodies means for applying braking forces gradually or abruptly, but in which the braking forces applied are at all times proportional to the forces exerted by the operator so that locking of the wheels cannot occur inadvertently but only at the option of the operator. The novel braking means is moreover of a simple nature, easy to construct, durable in use, inexpensive to manufacture and it may be applied to practically any make of motor vehicle without material alterations if not applied to the vehicle at the point of manufacture. In addition the braking apparatus herein disclosed is substantially identical for both front and rear wheels. The present invention is particularly directed to the brake operating mechanism, that is, to the transmission system for exerting the braking forces, and the invention includes certain improvements in the corresponding mechanism disclosed in my prior application, Ser. No. 687,602, filed January 21, 1924.

In the accompanying drawings and in the following description, one embodiment of the invention will be fully disclosed but it will be understood that this is set forth by way of example only and that the invention may take various forms depending upon the nature of the forces to be applied and the character of the vehicle into which the braking mechanism is to be incorporated.

In the drawings:

Figure 1 is a top plan view of the chassis of a motor vehicle to which my improved braking mechanism has been applied;

Figure 2 is a side elevation of the same;

Figure 3 is a front elevation of the vehicle front axle showing portions of the front wheel braking mechanism;

Figure 4 is a rear view of the rear axle showing portions of the rear brake actuating mechanism;

Figure 5 is a horizontal section through one of the rear wheel brakes;

Figure 6 is a section on line 6—6 of Figure 5;

Figure 7 is a plan view of portion of the rear brake actuating mechanism;

Figure 8 is a section on line 8—8 of Figure 7;

Figure 9 is a section on line 9—9 of Figure 7;

Figure 10 is a section on line 10—10 of Figure 6;

Figure 11 is a section on line 11—11 of Figure 3; and

Figure 12 is a fragmentary view of the hand operated mechanism for applying the brakes.

The side frame members of the chassis are indicated at 10, 10, the rear axle construction at 11 and the front axle at 12. Associated with each of the wheels is a brake mechanism of the same general character as that disclosed in my said prior application, but having certain improved details of construction as will be hereinafter more fully pointed out. For the simultaneous operation of these brakes by means of a manually operable member, for instance the foot pedal 13, means are provided operatively connecting the foot pedal to each of the brakes. This means is designed and constructed to insure the application of equal braking forces by both rear brakes and equal braking forces by both front brakes while at the same time insuring that the braking force applied by each rear brake is greater than the force applied by the corresponding front brake. Foot pedal 13 is mounted upon a rock shaft 14 which has its ends journaled in the side frame members 10 and is connected by means of a link 15 to a lever 16 fixed upon a parallel rock shaft 17 likewise having its ends rotatably supported in the side frame members. Fixed on rock shaft 17 are two arms or levers 18, substantially vertically disposed. Each of these levers is connected by means of a link 19 to a swinging bracket or rocker 20 pivotally supported at 21 from the chassis. Each rocker 20 is in turn connected by a link 22 to rear brake operating mechanism hereinafter to be fully described.

Shaft 17 has its ends extending outwardly beyond the outer surfaces of the side frame members and upon each end is mounted a depending arm or lever 23, the lower end of which is connected by a link 24 to a rocker 25 pivoted to the side frame member at 26. Each rocker 25 is connected by a forwardly extending link 27 to the front brake operating mechanism. Links 19 and 24 are not directly and positively connected to arms 18 and 23 respectively. Each of these arms carries at its outer end a pivoted sleeve 28 through which the corresponding rod slidably extends. Abutment nuts 30 and 31 on the rods 19 and 24 respectively, serve as abutments for the outer end of coil compression springs 32 and 33 and the inner ends of these springs bear respectively against the annular end of the sleeves through which the rods 19 and 24 extend. Depression of the foot pedal therefore causes compression of the springs prior to the actuation of rods 19 and 24. Springs 32 offer greater resistance to compression than springs 33 and for that reason a greater proportion of the manual effort of the operator is transmitted to the rear wheel braking mechanism than to the front wheel braking mechanism.

In Figures 5 to 9 inclusive one of the rear wheel brakes and its associated mechanism is illustrated. The rear axle housing is indicated at 35, the rear axle at 36 and the wheel hub at 37, a portion of the disk wheel 38 being shown. The outer end of the housing 35 is flanged at 39 and rigidly secured to this flange in any suitable manner is a disk-like member 40 having three outwardly projecting integral portions or fingers 41 substantially parallel to the axle 36 and extending into proximity with the disk 38 of the disk wheel. These fingers 41 are grooved on their inner faces at 42 to receive lugs 43, 43' projecting outwardly from annular pressure disks 44 and 45 respectively, which disks are disposed concentrically of the axle and on opposite sides of an annular friction plate 46, carried by and rigidly secured to the wheel hub 37. The member 40 being secured to flange 39, is relatively stationary, and hence fingers 41 and pressure members 44 and 45 will likewise be held against rotation. Intermediate the inner friction face of each pressure member 44 and 45 and the parallel friction faces of the friction disk 46 are positioned annular bands of friction material 47. These bands are loosely positioned, that is, they are not secured to either the pressure members 44 and 45 nor to the friction disk 46. Friction disk or annulus 46 is integral with the drum or cylindrical flange 48 of a flanged disk 49 centrally apertured to receive the hub 37 and the pressure members 44 and 45 surround this drum 48. The disk 49 is not secured directly to the hub 37, but is suitably secured to a flange 37' on the hub, by mechanism which permits adjustment of the friction annulus 46 longitudinally of the axle. This mechanism includes three spaced adjustable threaded studs 53, one of which is illustrated in Figure 5. Each stud 53 has threaded engagement with an aperture in the flange 37' and is provided with a polygonal head 54, the inner flat ends of the studs engaging the disk 49. Through each stud 53 a bolt 50 extends, each provided with a head 51 on its inner end and a nut 52 on its outer end. The studs 53 may be rotated by loosening nut 52 and applying a suitable tool to the polygonal head 54 thereof, and such rotation effects movement of disk 49 and the friction annulus 46 relative to the flange 37' of the hub. After such adjustment nut 52 may be tightened, which, of course, renders stud 53 relatively nonrotatable. The construction just described permits accurate adjustment of the disk 46 relative to the members 44 and 45.

Means are provided for drawing or forcing pressure members 44 and 45 simultaneously toward the friction annulus 46 to apply a friction retarding force on the movable annulus 46 and therefore retarding the motion of the vehicle. A plurality of levers 60 are pivotally supported at points 61 respectively on lugs 62 projecting outwardly from a ring 63, surrounding the flange 39, and secured to the outer face of the member 40 as by bolts 40ᵃ. Preferably the bolts 40ᵃ pass through slots in the member 40 which for a purpose hereinafter mentioned permits the ring 63 and the parts connected thereto to be adjusted circumferentially relative to the pressure members 44 and 45. The levers 60 preferably three in number are pivoted intermediate their lengths and the inner or long ends 60ᵃ thereof extend inwardly and are curved on an arc of a circle so that their extreme inner ends lie approximately 180° from their pivot points. I have found that this arrangement results in a better and more even and accurate operation of the levers. At their extreme inner ends the levers 60 bear against an operating ring 64 surrounding the axle 36 and movable longitudinally of the axle by means of slidable rods or fingers 65. Between their pivot points and their inner ends, each of the levers 60 is provided with a lug or hump 66 which bears against a flange 67 on the inner surface of the ring 64.

The outer or short end of each of the levers 60 has pivoted thereto as at 68 a hooked plate 69, which extends outwardly past the pressure plates 45 and 44. The outer end of each plate 69 is bent to engage a separate groove 44ᵃ in the outer surface of the pressure member 44. The pressure disks 44 and 45 are normally urged apart by coiled compression springs 70 (Fig. 10) one of which is mounted in each of the grooves 42 of the fingers 41 and positioned between the lugs 43 and 43' of the pressure disks, being held in place by a pin or rod 71 extending between the lugs 43 and 43'.

Means are provided for adjusting the parts of the brake to compensate for wear. The rear surface of flange 67 is divided into three equal portions 67ª, each slightly inclined to a plane normal to the axle 36. Each lug 66 bears against one of these inclined portions. Likewise the three grooves 44ª in the disk 44 are arranged at a slight angle to a plane normal to the axle 36. By loosening bolts 40ª, the ring 40 and levers 60 can be rotated about the axle 36 and the lugs 66 thus shifted relative to the inclined portions of the flange 67. This also serves to shift the hooked ends of the plates 69 in the inclined grooves 44ª. Thus by moving the ring 40 in one direction wear on the lugs 66 and disk 45 as well as wear on the hooked end of the plates 69 and the disk 44 may be compensated for, and by moving the ring in the opposite direction, additional play between each of the disks 44 and 45 and the friction disk 46 may be obtained.

The operation of the foregoing brake mechanism is substantially the same as that of my said prior application and is briefly as follows. Normally the pressure disks 44 and 45 are forced apart by the springs 70. When the ring 64 is forced outwardly by the plungers 65, the levers 60 move the disk 45 toward the disk 46 and simultaneously through the hooks 69 the disk 44 is drawn toward the disk 46. The annular friction bands 47 are thus clamped between the disks 44, 45 and the disk 46 and a braking action applied. The long levers 60 extending substantially half way around the ring 64, serve to give a smooth and even application of the braking force. In order that the pressure exerted against the friction disk 46 be substantially the same on both sides, it is necessary that this disk be accurately positioned between the pressure disks 44 and 45. Such accurate positioning of the disk 46 may be accomplished by means of the adjustable studs 53.

The brake mechanism thus far described is just as applicable to the front wheels as to the rear wheels of a vehicle. The present improvements include novel brake operating mechanism which is also substantially identical for both the front and rear wheels.

Referring first to the rear brake operating mechanism, the plungers 65 extend from the ring 64 inwardly through the flange 39 of the axle housing, there being preferably two such plungers, one arranged on opposite sides of the axle housing. Each of the plungers 65 extends through a pair of spaced lugs 75 carried by the axle housing, and each is preferably surrounded by a sleeve or bushing 76 arranged between the flange 39 and one of the lugs 75 and another sleeve or bushing 77 supported in the other lug 75 and into which the inner end of the plunger extends. Openings as indicated at 78 may be provided in the bushings 76 and 77 for the reception of oil or other lubricant for the plungers 65.

At each end of the axle housing 35, the two adjacent plungers 65 are rigidly connected by means of a curved yoke 80 which extends over the top of the housing and each end of which is clamped between two nuts 79 on a threaded portion of the plungers 65 between the lugs 75. Arranged on top of the axle housing above each yoke 80 is a cam box or casing 81, preferably supported on lugs 82 projecting from the housing and having a detachable cover 83. In each cam box or casing 81, there is arranged a flat wedge-shaped cam member 84, each of which is provided with a neck or extension 84ª projecting through a slot in the front edge of the casing and connected to one of the rods 22 heretofore described. Projecting upwardly from each of the yokes 80 is a lug 80ª which extends through a slot 85 in the bottom of the casing 81. Mounted on the lug 80ª within the casing 81 is an antifriction roller 80ᵇ which is adapted to bear against one of the inclined sides of the wedge-shaped cam 84. Connected to each of the yokes 80, preferably adjacent the lugs 80ª, is a coiled spring 86, the other ends of these springs being anchored to the axle housing. These springs serve to keep the rollers 80ᵇ in contact with the cams 84 and in addition insure retraction of the plungers 65 and rings 64 when the brakes are not in use.

One of the features of the present improvements consists in the provision of means for equalizing the brake applications on two opposite wheels of a vehicle to compensate for any wear or difference in adjustments of the brake mechanism. This is accomplished in a simple and effective manner.

Referring to the rear brake mechanism, there is provided an equalizing rod 88 which extends longitudinally of the rear axle housing and which is bent to correspond generally to the contour of the housing. The opposite ends of the rod 88 project through suitable openings into the cam boxes or casings 81 and on each end of said rod there is mounted an antifriction roller 89, which rollers are adapted to bear against the inclined sides of the cam members 84 opposite the rollers 80ᵇ. Intermediate its ends the rod 88 is slidably supported in a suitable keeper 90 attached to the axle housing.

In the present arrangement the brake operating mechanism for the front wheels is substantially identical with that heretofore described for the rear wheels. On each end of the front axle 12 there is mounted a casing or cam box 81ª supported at one end on a ledge on the axle and at the other in a lug projecting from the spring clip. Within the casings 81ª are cam members identical with the cam members 84 and the same are connected to the front ends of the rods 27. An equalizing rod 88ª slidably supported on the axle 12 extends between the casings 81ᵃ and rollers on the ends of this rod bear against the cam members within the casings 81ᵃ. The brake mechanism on the front wheels is operated by means of plungers 65ᵃ and rings 64ᵃ identical in operation with the plungers 65 and rings 64 of the rear wheels. The plungers 65ᵃ are connected by a curved yoke 91 so as to be simultaneously operable, and a compression spring 92 arranged between said yoke and the pivoted portion of the axle tends to keep the plungers 65ᵃ retracted. In an opening in each end of the axle 12 there is arranged a slidable rod 93 having a roller 94 adapted to bear against the curved yoke 91. At its inner end each slidable rod 93 extends into one of the casings 81ᵃ and is provided on such end with an antifriction roller like the roller 80ᵇ for engaging one side of the cam member in the casing.

It is apparent that when the foot pedal 13 is depressed the rear cam members 84 will be drawn forwardly and the corresponding front cam members drawn rearwardly. The plungers 65 and 65ᵃ will be forced outwardly and the brakes applied to all wheels. The equalizing rods 88 and 88ᵃ will insure an equal application of the braking force to the two rear wheels and to the two front wheels. When pressure on the pedal 13 is released, the parts will be restored to the normal inoperative position by the action of springs 70 on each of the wheels and the additional action of the springs 86 and 92.

In order that the brake mechanism heretofore described may be operated by hand, the following construction is provided. A hand lever 96 is pivotally supported on a projection 96ᵃ of the transmission housing. This lever 96 extends below its pivot and to the lower end thereof a rod 97 is connected, the other end of this rod being connected to an upwardly extending arm 98 loosely mounted on the shaft 17. Adjacent to and in front of the arm 98 is an arm 99 which is rigidly secured to shaft 17 and projects upwardly therefrom. The arm 99 is provided on its end with a laterally bent portion or lug 99ᵃ so positioned as to contact with the arm 98 when the latter is moved forwardly. It is obvious that when lever 96 is drawn rearwardly the shaft 17 will be caused to rotate to apply the brakes. Also it will be seen that the hand operated mechanism will not interfere with the application of the brakes from the foot pedal 13.

Various changes may, of course, be made in the details of the construction without departing from the spirit of the invention and within the scope of the appended claims.

Having thus described the invention, what is claimed as new and desired to be secured by Letters Patent is:

1. In a brake apparatus for vehicles, in combination with the two opposite wheels of the vehicle, a double-faced cam member arranged adjacent each wheel, a rod slidably supported between said cam members and arranged to bear at each end against one of the cam faces thereof, an operating member adapted to bear against each of the opposite faces of said cam members, brake mechanism on each wheel adapted to be operated by said operating members, and means for simultaneously operating said cam members.

2. In a brake apparatus for vehicles, in combination with the two opposite wheels of the vehicle, a slidable cam member arranged adjacent each wheel and each having two oppositely inclined cam faces, a rod slidably supported between said cam members and arranged to bear at each end against one of said cam faces, an operating member slidably supported adjacent each of said wheels and bearing against the opposite faces of said cam members, brake mechanism on each wheel adapted to be operated by said operating members, and means for simultaneously moving said cam members.

3. In a brake apparatus for vehicles, in combination with the two opposite wheels of the vehicle and an axle housing connecting the same, a cam member mounted on said housing adjacent each wheel and each having two oppositely inclined cam faces, a rod arranged between said cam members and adapted to slide longitudinally of said housing, said rod at each end being arranged to bear against one of the faces of said cam member, a separate operating member slidably supported on said housing adjacent each wheel, each of said operating members at its inner end having a part adapted to bear against the other inclined face of said cam member, brake mechanism on each of said wheels operatively connected to said operating members, and means for simultaneously moving said cam members.

4. In a brake apparatus for vehicles, in combination with the two opposite wheels of the vehicle, a cam member arranged adjacent each of said wheels and each having an inwardly and an outwardly inclined cam face, an equalizing rod slidably supported between said cam members and having each end arranged to bear against the inner cam face of one of said cam members, slidable members arranged to bear against the outer faces of said cam members, brake mechanism on each wheel adapted to be operated by said slidable members, and means for simultaneously operating said cam members.

5. In a brake apparatus for vehicles, a cam member supported adjacent each wheel of the vehicle and each having inner and outer cam faces, a slidably supported equalizing rod extending between the front cam members and bearing at its ends against the inner faces of said front cam members, a slidably supported equalizing rod extending between the rear cam members and bearing at its ends against the inner faces of said rear cam members, brake mechanism carried by each wheel, a slidable operating member for each brake mechanism, each of said operating members being arranged to bear against the outer cam face of one of said cam members, and means for simultaneously operating said cam members.

6. In a brake apparatus for vehicles, in combination with the two opposite wheels of the vehicle, a wedge-shaped cam member arranged adjacent each wheel, means for simultaneously moving said cam members in a direction transverse to the axes of the wheels, an equalizing rod extending between and bearing against the inner faces of said cam members, brake mechanism on each wheel, and means engaging the outer face of each of said cam members for operating said brake mechanism when said cam members are moved.

In testimony whereof I hereunto affix my signature.

CLARENCE Z. SMITH.